Nov. 18, 1958 G. A. LYON 2,860,925
WHEEL COVER
Filed March 26, 1956 2 Sheets-Sheet 1
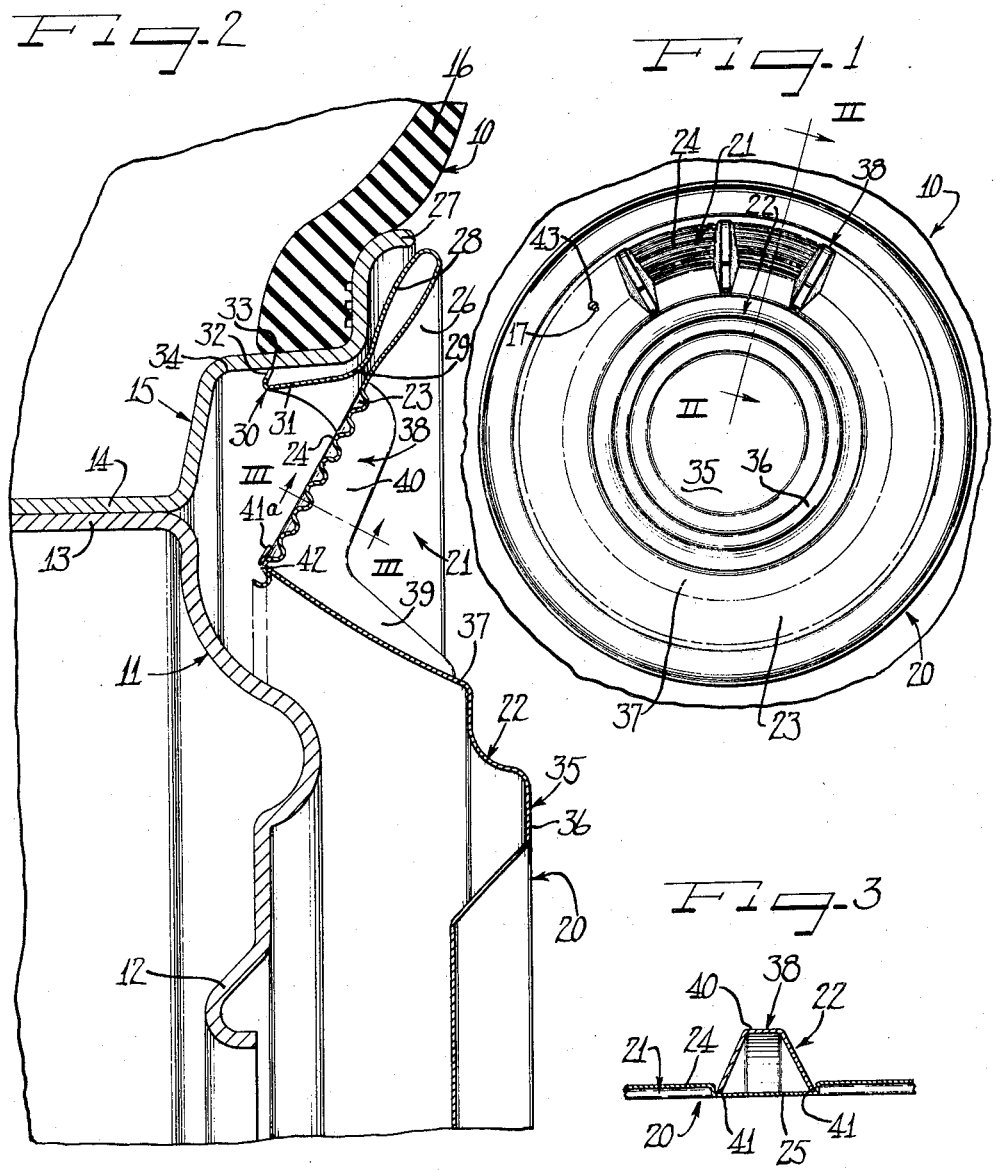
Inventor
George Albert Lyon Nov. 18, 1958  G. A. LYON  2,860,925
WHEEL COVER Filed March 26, 1956  2 Sheets-Sheet 2

Inventor
George Albert Lyon

United States Patent Office 2,860,925
Patented Nov. 18, 1958

2,860,925

WHEEL COVER

George Albert Lyon, Detroit, Mich.

Application March 26, 1956, Serial No. 573,923

13 Claims. (Cl. 301—37)

This invention relates generally to a wheel stucture and more particularly to a new multi-part wheel cover construction.

Presently there is still existent a demand for a spoke type cover construction which tends to simulate to a certain extent a spoked-type wheel and possesses a highly ornamental and lustrous appearance as opposed to a spoke type wheel. To this end there is herein disclosed a multi-part cover construction including axially inner and outer cover members in overlying relation to one another. Retaining means have been provided not only for maintaining the cover assembly in engagement upon the wheel, but also for maintaining the individual cover members in assembly with one another. The inner cover member has been provided with circumferentially spaced sets of radially spaced arcuate reinforcing ribs with the sets separated from one another by seats. The outer cover member has been provided with circumferentially spaced spoke simulating elements which are adapted to be received in the seats on the inner cover member when assembled.

Accordingly, an object of this invention is to provide a new and improved multi-part cover construction.

Yet another object of this invention is to provide a highly ornamental multi-part cover construction having components which may be made from metal stampings of different contrasting materials which lend themselves to being polished to give a highly lustrous finish.

A further object of this invention is to provide a multi-part cover construction having a new and improved inter-relationship between the component members, the components having means to maintain them in assembly together.

A still further object of this invention is to provide a new and improved spoke-type cover construction which lends itself to being manufactured on a large production basis and which is relatively economical to manufacture.

According to the features of this invention there is provided in a multi-part cover structure including an axially inner ring member and an axially outer central disc member in overlying engagement with one another, the cover structure having retaining means to retain same upon a vehicle wheel, the inner ring member having a radially inner generally radially and axially inwardly extending margin with circumferentially spaced sets of radially spaced arcuate ribs with each set separated from one another by a seat, the outer central disc member having a generally axially inwardly radially outwardly extending outer margin provided with a series of circumferentially spaced struck-out spoke-like elements each in bottomed engagement in one of the seats on said inner margin, and means to maintain the disc and ring members in interlocked assembly, the means to maintain the disc and ring members in interlocked assembly including circumferentially spaced slots on the generally radially and axially inwardly extending margin and circumferentially spaced extensions on the generally axially inwardly radially outwardly extending outer margin with each of the extensions extending through one of the slots.

Other objects and features of the present invention will more fully become apparent from the following detailed description taken in conjunction with the accompanying drawings illustrating a single embodiment thereof and in which:

Figure 1 is a side elevation of my novel wheel structure embodying features of the present invention;

Figure 2 is an enlarged fragmentary cross sectional view taken substantially on the line II—II of Figure 1 looking in the direction indicated by the arrows;

Figure 3 is an enlarged fragmentary cross sectional view taken substantially on the line III—III of Figure 2 looking in the direction indicated by the arrows;

As shown on the drawings:

Figure 4:
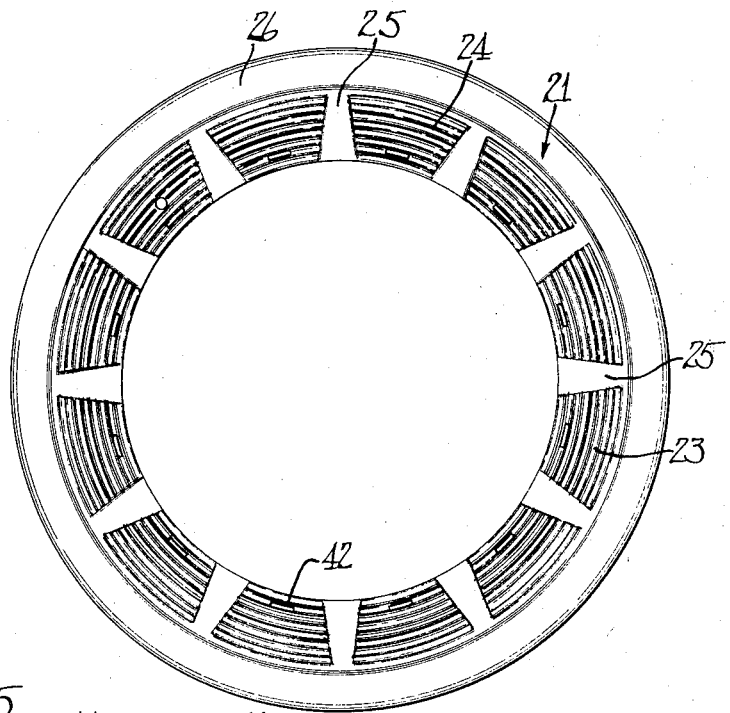
Figure 4 is an enlarged plan view of an axially inner member of my cover assembly.

The reference numeral 10 indicates generally a wheel structure including a body part 11 having a conventional bolt-on flange 12 by which the wheel and body part may be secured to the axle of a vehicle wheel by means of bolts and the like.

The body part 11 includes an attachment flange 13 which is suitably connected to a base flange 14 of a stepped multi-flange tire rim 15.

Carried upon the tire rim 15 is a tire assembly 16 which may be either a tube or tubeless type and is adapted to be inflated by a valve stem 17.

Figure 5:
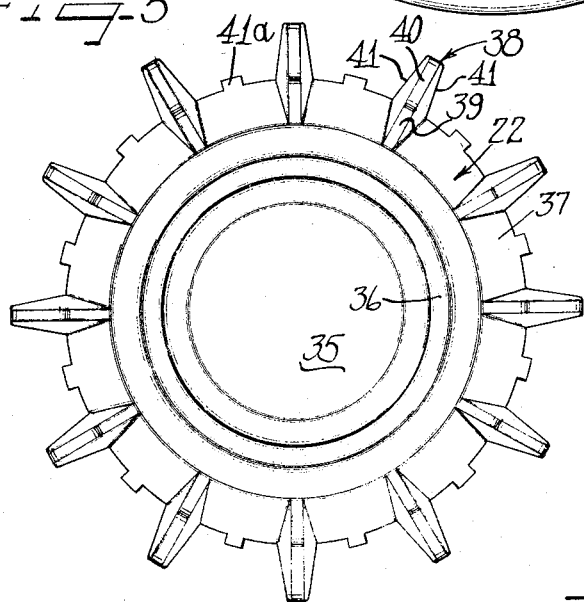
Figure 5 is an enlarged plan view of an axially outer cover member of my cover assembly.

Carried upon the wheel structure 10 is my novel multi-part cover assembly 20 including an axially inner cover member or ring member 21 (Figure 4) and an axially outer cover member or central disk 22 (Figure 5). The cover members 21 and 22 lend themselves to being made from different materials such as stainless steel and aluminum. As an example, the axially inner cover member 21 may be made from stainless steel while the axially outer cover member 22 may be made from aluminum or some other alloy. By using different types of metals a highly ornamental cover assembly 20 may be attained having a distinctive contrasting highly lustrous appearance.

The axially inner cover member or ring 21 includes a generally radially and axially outwardly extending intermediate portion 23 which is provided with circumferentially spaced sets of radially spaced arcuate ribs or corrugations 24. Each of the sets of the ribs 24 are circumferentially separated from one another by circumferentially spaced generally radially extending depressed portions 25 (Figure 3) each defining a seat. The cover member 21 is provided with an outer margin 26 which is in overlying spaced relationship to the terminal flange 27 of the tire rim 15. The margin 26 is continuously underturned and has a generally radially and axially inwardly extending flange 28 which in turn merges with a generally axially inwardly extending resilient flange 29. This flange 29 has formed at the innermost end thereof, a plurality of circumferentially spaced resilient retaining extensions 30. Each of the extensions 30 includes a relatively long axial leg 31 and a relatively short stiff radial leg 32 terminating in a biting gripping extremity 33. The edges 33 are adapted to bite into the intermediate rim flange 34 when the cover member 21 is in assembly with the wheel.

The outer cover member or central disc 22 includes an elevated depressed crown 35 including an annular rib 36. The rib 36 is in turn connected to a generally radially outwardly axially inwardly extending cover portion 37. The portion 37 cooperates with the intermediate portion 23 to define an annular dished area. Pressed out of the cover portion 37 at circumferentially spaced intervals are a series of spoke-like elements 38 which are to line the aforementioned dished area. Each of the elements 38 includes a generally axially inwardly radially outwardly extending portion 39 (Figure 2) and a generally radially and axially outwardly extending portion 40. The cover portion 40 extends in substantially parallel relationship with the corresponding inner cover portion 25.

Each of the spoke portions 40 includes spaced edges 41 (Figures 3 and 5) which are adapted to grip and engage within the depressed portions or seats 25 when the cover members 21 and 22 are in assembly together.

At suitable intervals on the generally axially inwardly radially outwardly extending cover portion 37 of the outer cover member 20 are integral extensions or tabs 41a. Similarly, the axially inner cover portion 21 is provided at circumferentially spaced intervals with slots 42 which are adapted to receive therethrough the extensions 41a. The tabs after they are inserted through the slots are then deformed to maintain the cover members 21 and 22 in assembly.

As the tabs 41a and the slots 42 are brought into alignment, the spoke-like elements 38 are also brought into axial alignment with respect to the seats 25 on the inner cover 21. Once the tabs have been bent or deformed each of the spoke-like elements 38 is brought into bottomed engagement within the corresponding depressed portion or seat 25.

It will be appreciated that after the cover members 21 and 22 have been assembled together, they do not readily lend themselves to being disassembled unless the entire cover assembly is removed from the wheel and the extensions or tabs 41a are bent or deformed so they may pass through the slots 42.

In the assembly of the cover assembly 20 upon the wheel, the valve stem 17 is initially aligned with respect to opening 43 in the cover member 21. By this expedient, the retaining fingers 30 are brought into general alignment with the intermediate rim flange 34. Thereafter, upon the application of an axially inward force, the fingers are sprung slightly radially inwardly with the edges 33 in biting gripping engagement with the tire rim. This action is brought about as a result of arranging the edges 33 in a common circle having a diameter slightly larger than the inside diameter of the rim flange 34.

The cover may be removed from the wheel by inserting any suitable pry-off tool, such as a screw driver, underneath the cover margin 28 and upon a twisting levering action, the fingers 30 may be disengaged from the rim flange 34 with the result that the cover assembly 20 is removed from the wheel 10.

It will be understood that modifications and variations may be effected without departing from the scope of the novel concepts of the present invention.

I claim as my invention:

1. A multi-part cover structure including an axially inner cover member and an axially outer cover member in overlying relation to one another, said cover structure having means to retain same upon a vehicle wheel, said inner cover member provided with a portion having circumferentially spaced sets of ribs separated by seats, said outer cover member having a series of circumferentially spaced spoke-like elements for disposition in said seats, and means for maintaining said cover members assembled.

2. In a wheel structure including a wheel having body and rim parts, a cover structure in overlying relation to the wheel and including radially inner and radially outer cover members, means for maintaining said cover structure in retained engagement on the wheel, a second means for maintaining said cover members assembled, circumferentially spaced spoke-like elements on one of said cover members, and circumferentially spaced depressed portions on the other of said cover members with the spoke elements bottomed in assembly therein.

3. A multi-part cover structure including an axially inner ring member and an axially outer central disc member in overlying engagement with one another, said cover structure having retaining means to retain same upon a vehicle wheel, said inner ring member having a radially inner margin with circumferentially spaced sets of radially spaced arcuate ribs with each set separated from one another by a seat, said outer central disc member having at its outer margin a series of circumferentially spaced spoke-like elements each having edges in bottomed engagement in one of said seats on said inner margin, and means to maintain said disc and ring members in interlocked assembly.

4. A multi-part cover structure including an axially inner ring member and an axially outer central disc member in overlying engagement with one another, said cover structure having retaining means to retain same upon a vehicle wheel, said inner ring member having a radially inner generally radially and axially inwardly extending margin with circumferentially spaced sets of radially spaced arcuate ribs with each set separated from one another by a seat, said outer central disc member having a generally axially inwardly radially outwardly extending outer margin provided with a series of circumferentially spaced struck-out spoke-like elements each in bottomed engagement in one of said seats on said inner margin, and means to maintain said disc and ring members in interlocked assembly.

5. A multi-part cover structure including an axially inner ring member and an axially outer central disc member in overlying engagement with one another, said cover structure having retaining means to retain same upon a vehicle wheel, said inner ring member having a radially inner generally radially and axially inwardly extending margin with circumferentially spaced sets of radially spaced arcuate ribs with each set separated from one another by a seat, said outer central disc member having a generally axially inwardly radially outwardly extending outer margin provided with a series of circumferentially spaced struck-out spoke-like elements each in bottomed engagement in one of said seats on said inner margin, and means to maintain said disc and ring members in interlocked assembly, said means to maintain said disc and ring members in interlocked assembly including circumferentially spaced slots on said generally radially and axially inwardly extending margin and circumferentially spaced extensions on said generally axially inwardly radially outwardly extending outer margin with each of said extensions extending through one of said slots.

6. In a wheel structure including a wheel having rim and body parts, a multi-part cover structure in overlying disposition upon the wheel including an axially inner cover member and an axially outer cover member in overlying relation to one another, said cover structure having retaining means to retain same upon one of the parts of the vehicle wheel, said inner cover member provided with an intermediate portion having circumferentially spaced sets of radially spaced arcuate ribs with each set separated from one another by a seat, said outer cover member having a series of circumferentially spaced spoke-like elements each disposed in one of said seats on said intermediate portion, and means to maintain said cover members in interlocked assembly.

7. In a wheel structure including a wheel having rim and body parts, a multi-part cover structure including an axially inner cover member and an axially outer cover member in overlying relation to one another, said cover members having means to maintain same assembled, means to retain said cover structure in assembly with the wheel, circumferentially spaced spoke-like elements on said outer cover member, and circumferentially spaced depressed seats on said inner cover member receptive of said spoke-like elements.

8. In a wheel structure including a wheel having rim and body parts, a multi-part cover structure in overlying disposition upon the wheel including an axially inner cover member and an axially outer cover member in overlying relation to one another, said cover structure having retaining means to retain same upon one of the parts of the vehicle wheel, said inner cover member provided with an intermediate portion having circumferentially spaced sets of radially spaced arcuate ribs with each set separated from one another by a seat, said outer cover member having a series of circumferentially spaced spoke-like elements each disposed in one of said seats on said intermediate portion, and means to maintain said cover members in interlocked assembly, said inner cover member having a turned under outer margin with said retaining means comprising circumferentially spaced retaining extensions each emanating from said turned under outer margin.

9. In a wheel structure including a wheel having rim and body parts, a multi-part cover structure in overlying disposition upon the wheel including an axially inner cover member and an axially outer cover member in overlying relation to one another, said cover structure having retaining means to retain same upon one of the parts of the vehicle wheel, said inner cover member provided with an intermediate portion having circumferentially spaced sets of radially spaced arcuate ribs with each set separated from one another by a seat, said outer cover member having a series of circumferentially spaced spoke-like elements each disposed in one of said seats on said intermediate portion, and means to maintain said cover members in interlocked assembly, said means to maintain said cover members assembled including circumferentially spaced slots on said inner cover member and circumferentially spaced tabs on said outer cover member with each of said tabs extending through one of said slots.

10. In a wheel structure including a wheel having rim and body parts, a multi-part cover structure in overlying disposition upon the wheel including an axially inner cover member and an axially outer cover member in overlying relation to one another, said cover structure having retaining means to retain same upon one of the parts of the vehicle wheel, said inner cover member provided with an intermediate portion having circumferentially spaced sets or radially spaced arcuate ribs with each set separated from one another by a seat, said outer cover member having a series of circumferentially spaced spoke-like elements each disposed in one of said seats on said intermediate portion, and means to maintain said cover members in interlocked assembly, said inner cover member having a turned under outer margin with said retaining means comprising circumferentially spaced retaining extensions each emanating from said turned under outer margin, said means to maintain said cover members assembled including circumferentially spaced slots on said inner cover member and circumferentially spaced tabs on said outer cover member with each of said tabs extending through one of said slots.

11. In a wheel structure including a wheel having rim and body parts, a cover structure in overlying disposition upon the wheel including a radially inner cover member and an axially outer cover member in generally radial relation to one another with said members defining an annular dished juncture, means joining the members together, said cover structure having retaining means to maintain the same upon one of the parts of the vehicle wheel, said cover structure and more particularly one of said cover members having means defining circumferentially spaced seats, and the other of said cover members having a series of circumferentially spaced elements each disposed in said seats insuring co-rotation of the cover members when in assembly on the wheel.

12. In a wheel structure including a wheel having rim and body parts, a cover structure in over-lying disposition upon the wheel including a radially inner cover member and an axially outer cover member in generally radial relation to one another with said members defining an annular dished juncture, means joining the members together, said cover structure having retaining means to maintain the same upon one of the parts of the vehicle wheel, said cover structure and more particularly one of said cover members having means defining circumferentially spaced seats, and the other of said cover members having a series of circumferentially spaced elements each disposed in said seats insuring co-rotation of the cover members when in assembly on the wheel, said elements being generally U-shaped and each having radially extending edges in edgewise abutting engagement against said seat.

13. In a wheel structure including a wheel having rim and body parts, a cover structure in overlying disposition upon the wheel including a radially inner cover member and an axially outer cover member in generally radial relation to one another with said members defining an annular dished juncture, means joining the members together, said cover structure having retaining means to maintain the same upon one of the parts of the vehicle wheel, said cover structure and more particularly one of said cover members having means defining circumferentially spaced seats, and the other of said cover members having a series of circumferentially spaced elements each disposed in said seats insuring co-rotation of the cover members when in assembly on the wheel, said elements each including a generally radially and axially inwardly extending spoke-like portion and a generally radially and axially outwardly extending spoke-like portion with each of said radially and axially outwardly extending spoke portions bottomed in one of said seats.

References Cited in the file of this patent

UNITED STATES PATENTS

| | | |
|---|---|---|
| D. 176,306 | Buerger | Dec. 13, 1955 |
| 2,244,014 | Lyon | June 3, 1941 |

FOREIGN PATENTS

| | | |
|---|---|---|
| 494,525 | Canada | July 21, 1953 |